Oct. 13, 1964
W. O. RUSSELL
3,152,586
COOKING APPARATUS
Original Filed Nov. 20, 1956
7 Sheets-Sheet 6
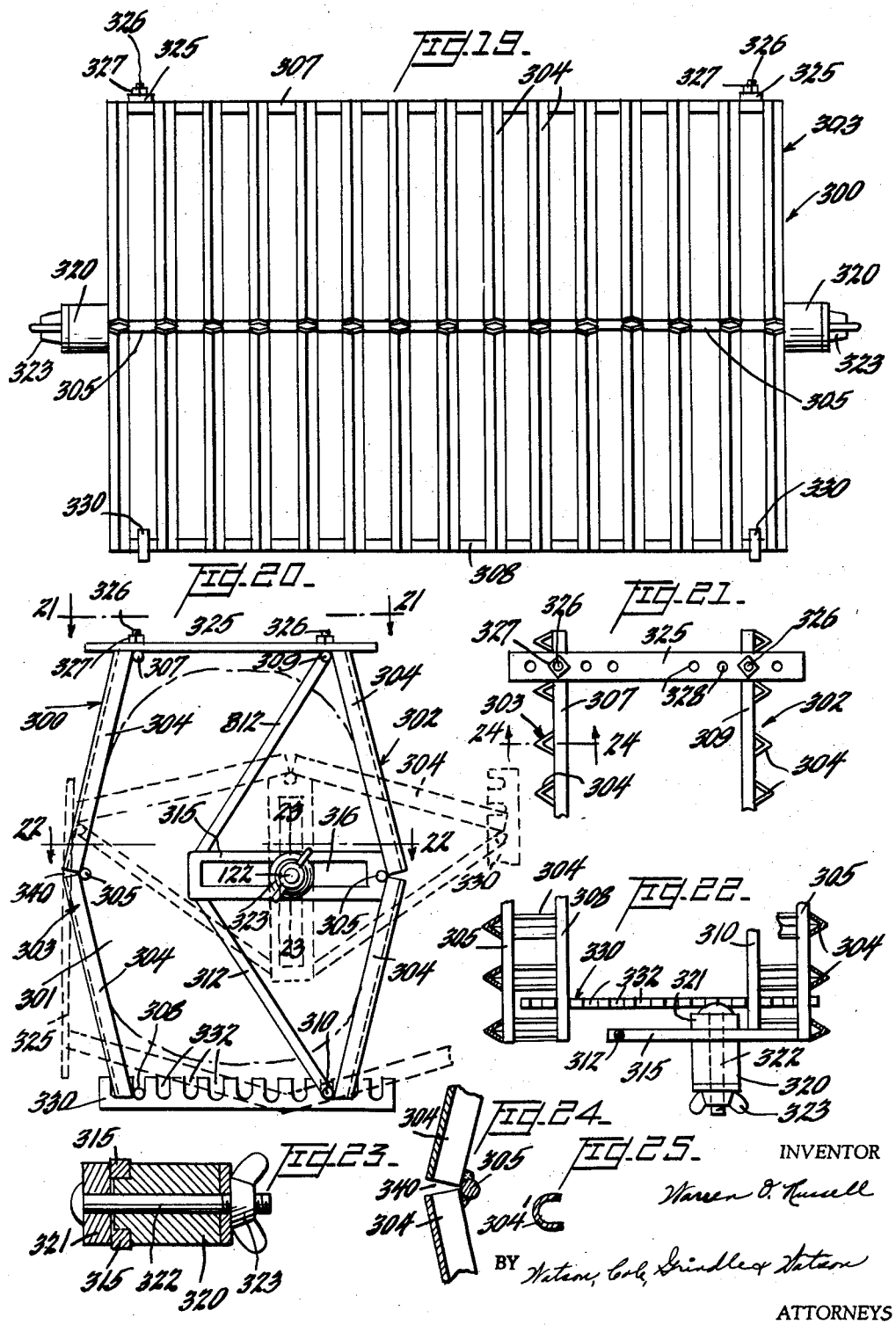
INVENTOR
Warren O. Russell
BY Watson, Cole, Grindle & Watson
ATTORNEYS

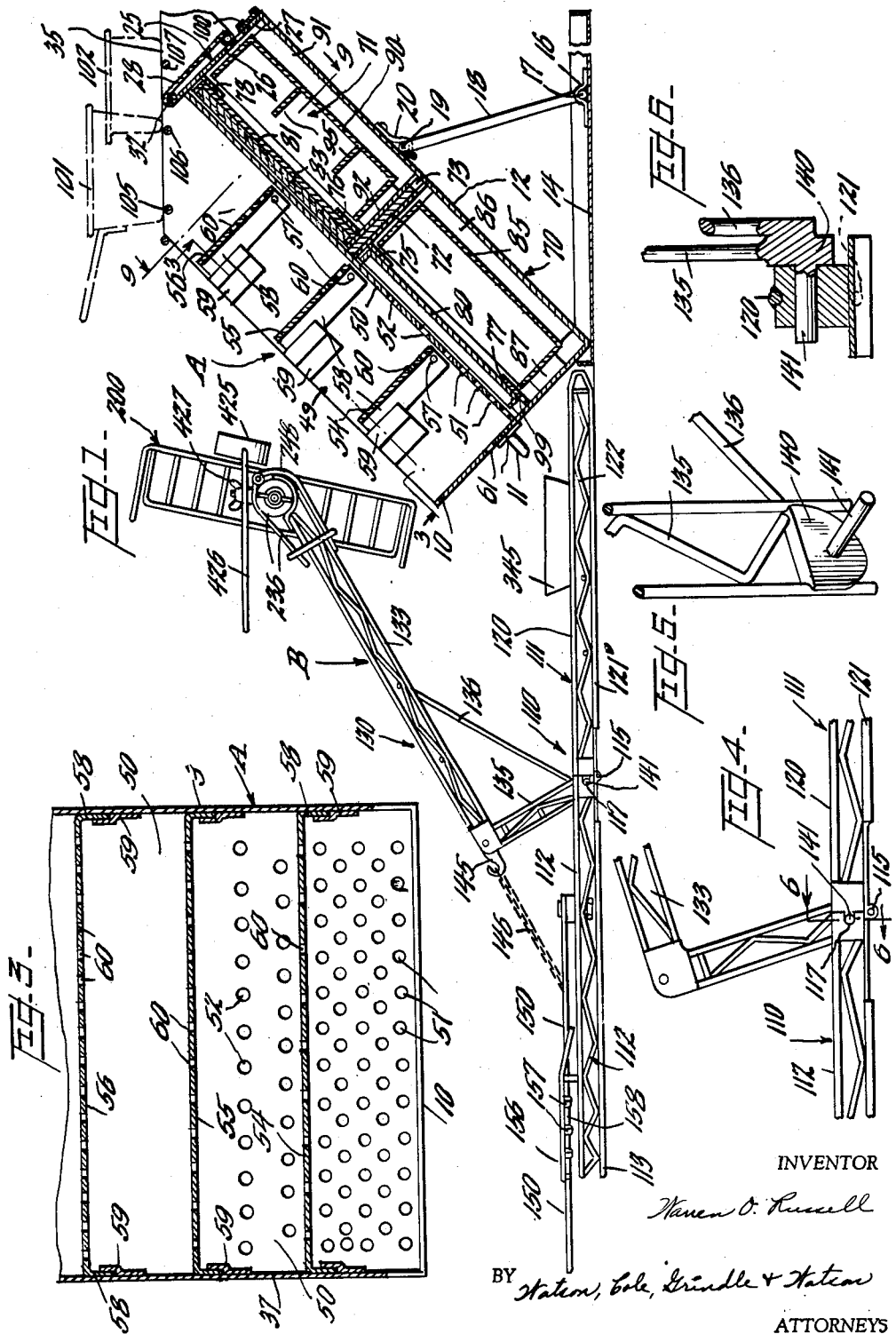

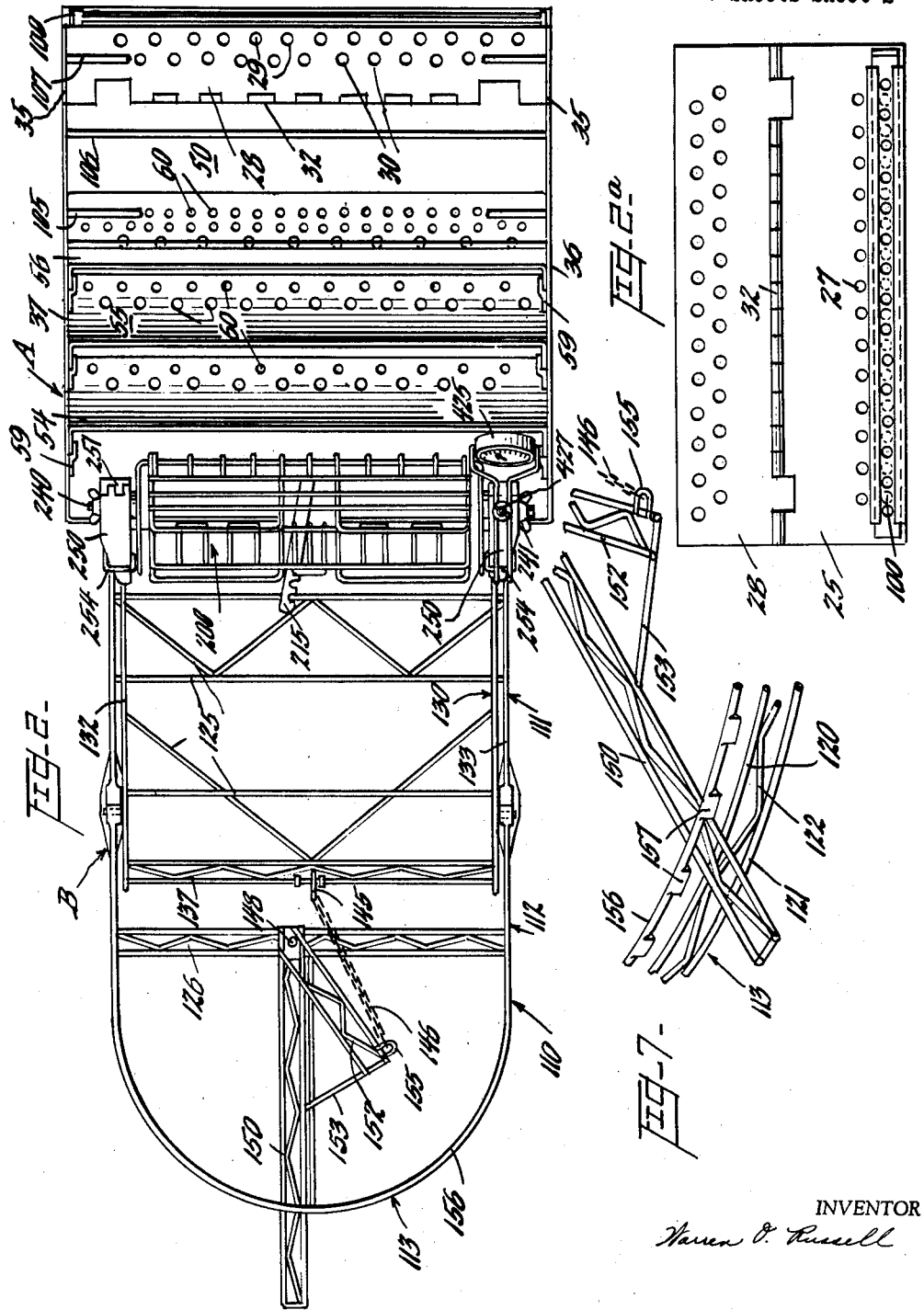

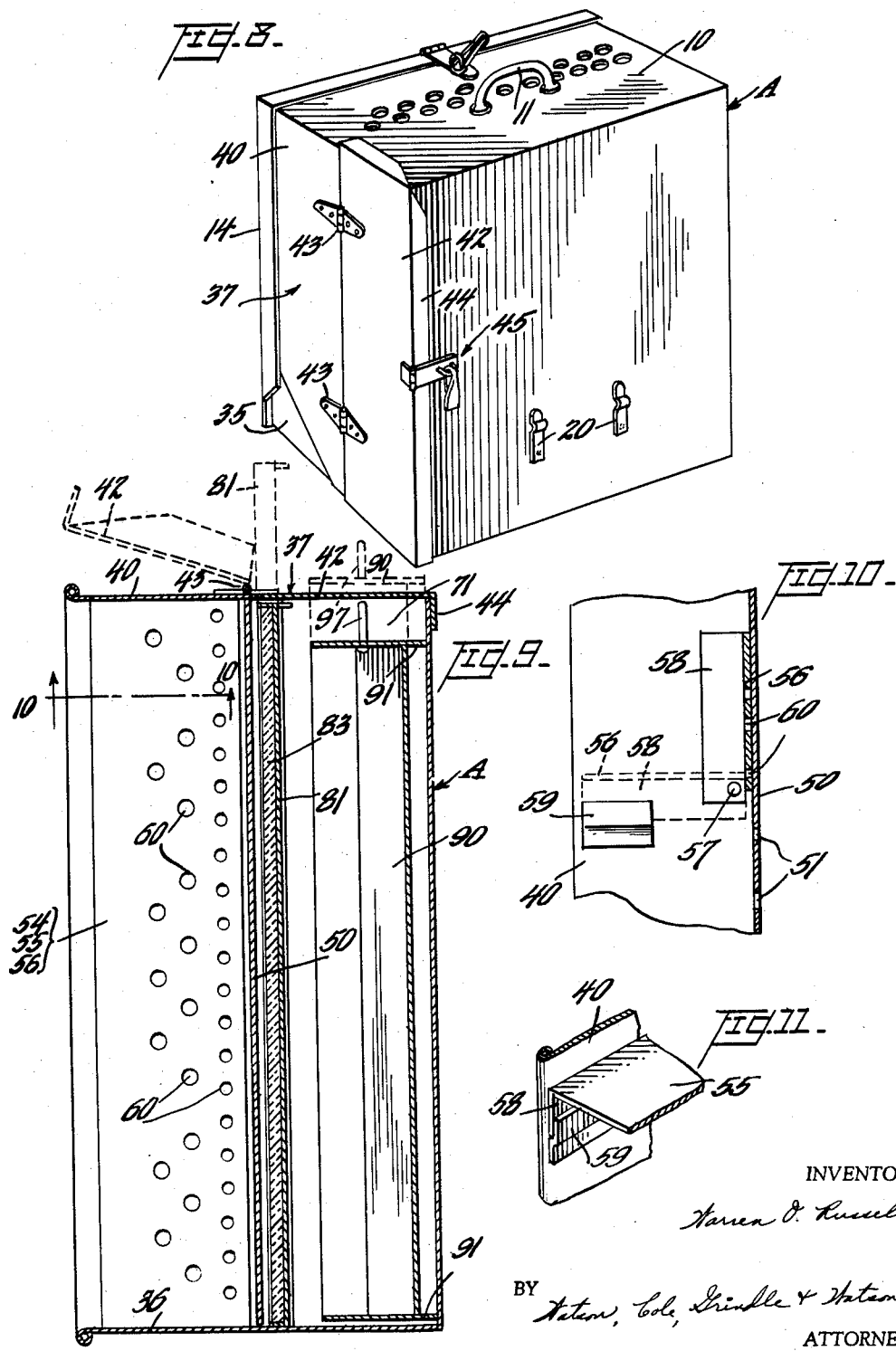

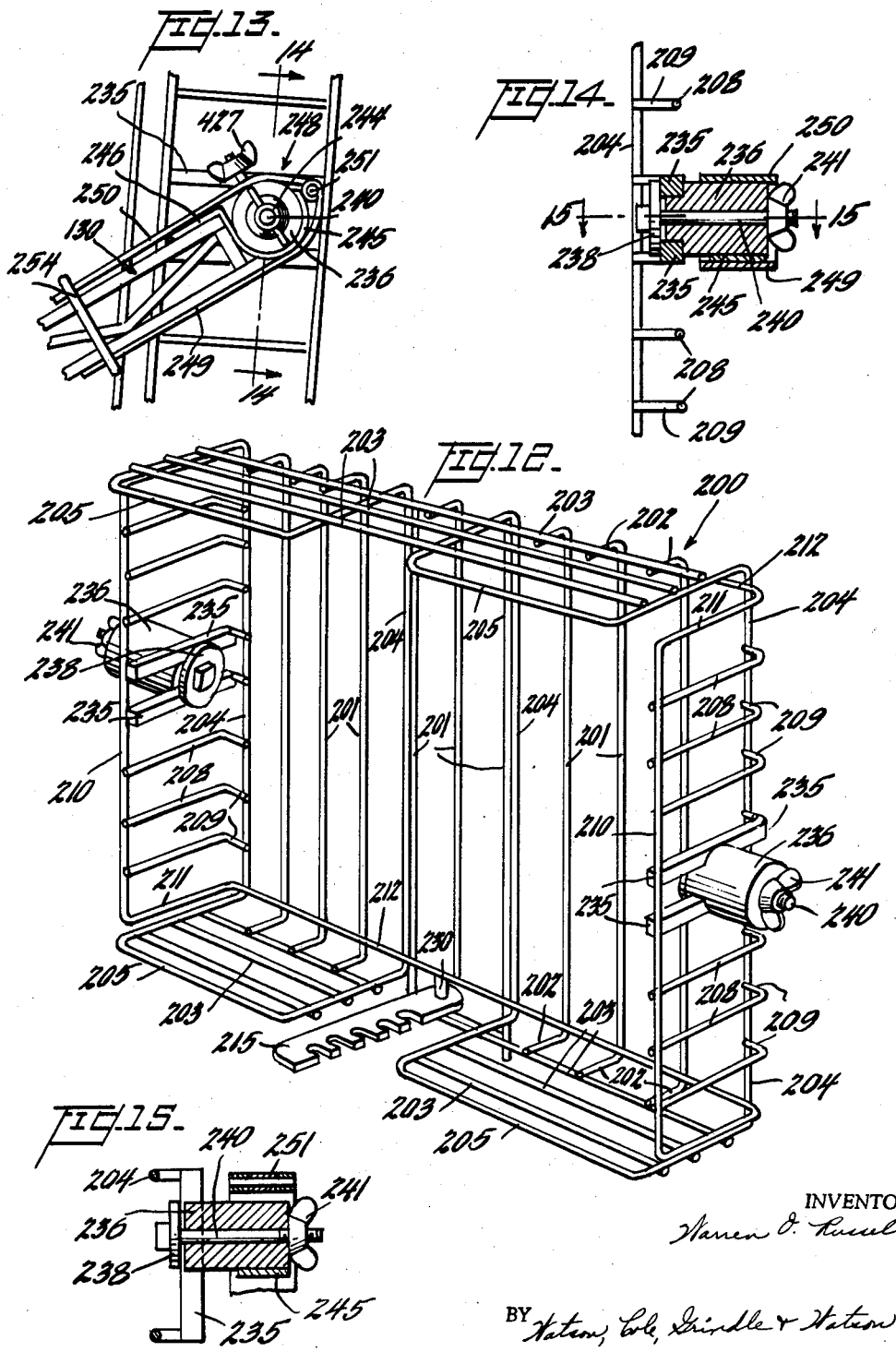

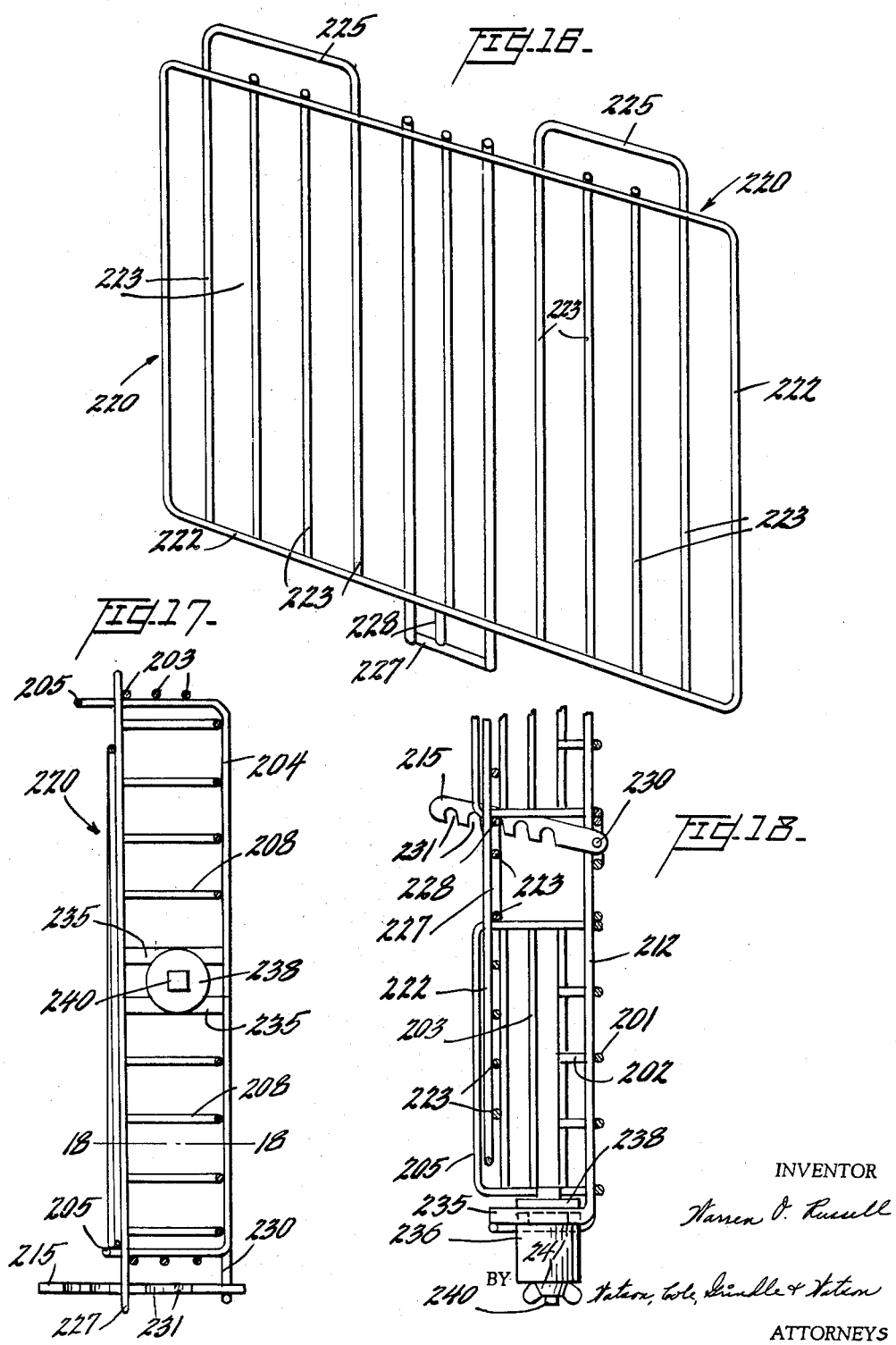

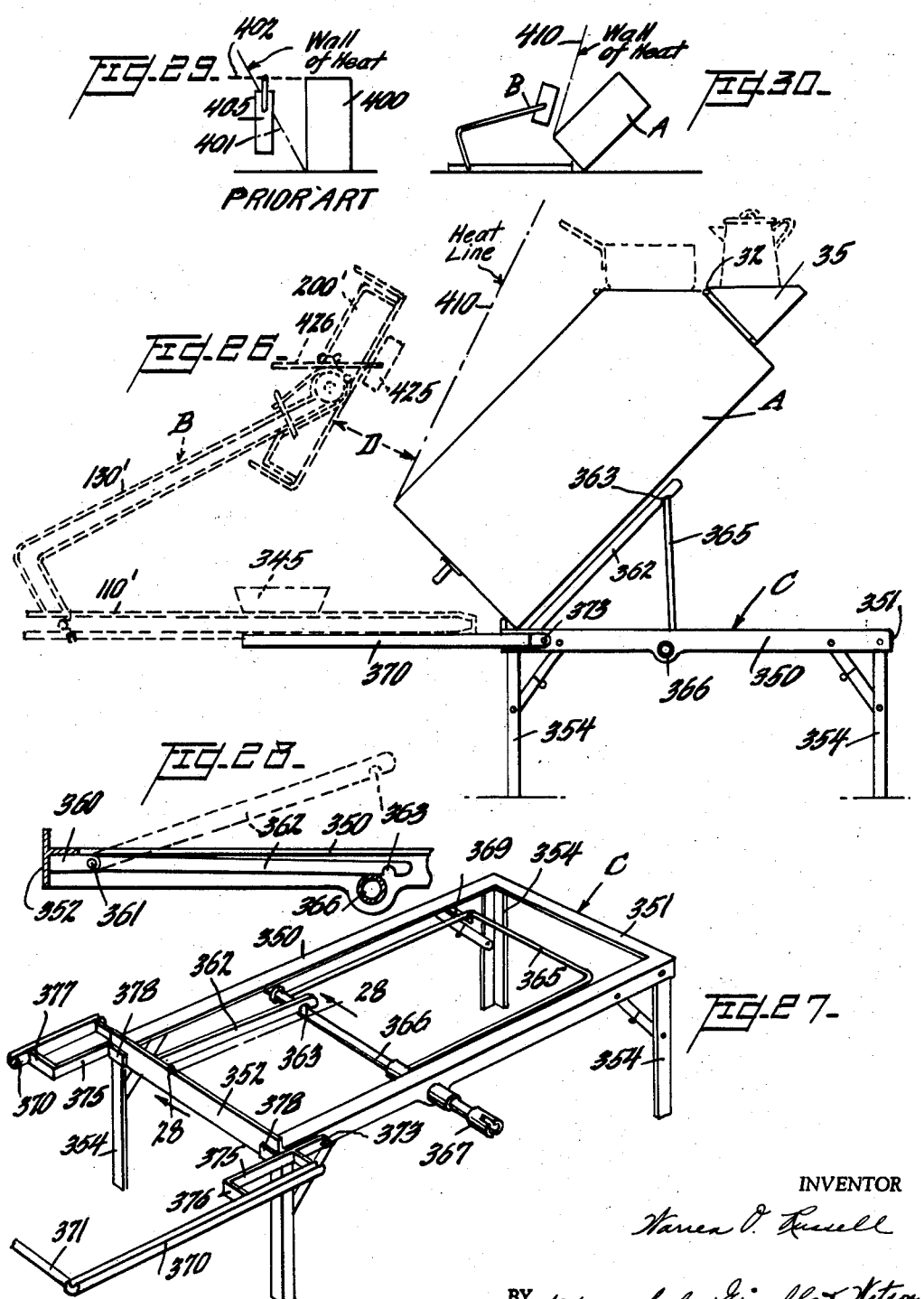

these figures and certain of the detail views developing this embodiment, the firebox and oven section is indicated generally by the reference character A while the cooperating adjustable broiler section of the device together with its supporting crane or derrick has the general designation B.

Now taking into consideration FIGURES 1, 2, 3, 8 and 9, the detailed construction of the section A of the apparatus will be understood. This section is of a general rectangular box-like shape, and for purposes of clearer explanation, the various parts will be referred to as they assume their positions while the unit A is in diagonal tilted position as clearly shown in FIGURE 1. Thus, the surface 10 of the firebox and oven section, while it constitutes the top side of the unit when folded for travel as shown in FIGURE 8, is actually what may be called the bottom surface of the unit when set up for use as in FIGURE 1. The handle 11 by which the entire apparatus may be transported when packed for travel occupies an out-of-the-way position when the device is in use. The broad side surface 12 of the section becomes the rear surface in use and the cover member 14, removed from the opposite side of the device, is employed as a base plate deposited upon the ground as in FIGURE 1 with its front flange 15 abutting the corner portion of the unit A between the surfaces 10 and 12. The cover or pan 14 contains brackets 16 into which the upwardly extending prongs 17 of the U-shaped brace 18 are pivotally secured. The bight 19 of the U-brace 18 is adapted to be snapped beneath the spring clamping brackets 20, and the tray and brace combination 44, 18 is so proportioned as to serve effectively as a bracing support for the unit A maintaining it at the optimum angle of approximately forty-five degrees, although certain variations from this angularity may be tolerated under some conditions and for certain purposes.

The side opposite to the side 10 of the unit, shown best in FIGURE 2A of the drawings, is designated 25 and comprises the fixed portion 26 having a row of openings 27 along one edge thereof, and a hinged portion 28 which has a double row of apertures 29 and 30. The sections are hinged together in any suitable way along the hinge line 32 and the portion 28 is preferably curled or beaded along its edge 33.

It will be noted that the hinged portion 28 of the side 25 carries a triangular section 35 of each of the side walls of the unit A, which side walls have been given the respective designations 36 and 37. The portions 35 are cut away from the walls 36 and 37 on a forty-five degree angle so that when the pivoted section 28 is swung to open position as shown in FIGURE 1 the lines of severance are in horizontal alignment. This arrangement serves a purpose which will be described in connection with the operation of the apparatus.

The sixth side of the section A will now be described. As previously indicated, this side is designated generally by the reference character 37 and is best seen in FIGURES 8 and 9 of the drawings. The surface 37 has a fixed portion 40 (from which one of the segments 35 has been taken) and a pivoted section 42, these sections being connected by the hinges 43. The section 42 is provided with an overlapping flange 44 and a hasp and lock 45 may be provided for securing the section 42 in closed position. The hinge section or door 42 is shown in open position in dotted lines in FIGURE 9 of the drawings.

The forward portion of the combined firebox and oven section A will now be described. A partition 50 separates the forward firepot compartment 49 from the rearward oven compartment, as clearly shown in FIGURES 1 and 9 of the drawings, and it will be seen that substantially the lower half of the partition is provided with rows of apertures 51 and 52. The firepot portion 49 of the unit is divided into four compartments in the embodiment illustrated herein, these compartments being separated one from the other by the pivoted flanged partitions 54, 55 and 56, these partitions being pivoted upon the pintles 57 and the flanges 58 adapted to be moved behind the brackets 59 to be held in operative position. Each of the partitions 54, 55 and 56 is provided with perforations 60 and the end wall 10 is provided with the rows of perforations 61, all of which provide draft openings for the fires maintained by the burning fuel in one or more of the several compartments, depending upon the amount of heat required and the extent of the cooking operation. Of course, the entire forward face of the unit A is open, due to the removal of the cover plate 14 which now acts as a supporting tray for the unit.

The rear half of the section A comprises a two-section roasting or baking oven and access to this part of the apparatus may be had by opening the door 42 as shown in FIGURES 8 and 9 of the drawings, whereupon the interior will be disclosed substantially as shown in the sectional view comprising the right-hand side of FIGURE 1.

The lower compartment designated generally by the numeral 70 is separated from the upper compartment 71 by means of the partition 72 which may comprise a pair of spaced metal panels between which is inserted a plate of insulating material. This partition 72 is provided with a series of openings 73 at the rear edge thereof through which hot gases may pass as later described.

Extending in opposite directions from both sides of the partion 72 are the supporting flanges 75 and 76, and similar inwardly directed flanges 77 and 78 are secured to the inner surfaces of the walls 10 and 25. Forwardly of these flanges are slidably disposed the removable flanged panels 80 and 81. Panel 80 is shown merely as a metal tray while panel 81 is combined with a sheet or block of insulating material 83. These respective panels 80 and 81 comprise the forward walls of the compartments 70 and 71.

A roasting or baking box or tray 85 having end supporting flanges 86 and a spacing element 87 formed thereon is slidably mounted within the compartment 70 and capable of removal through the opening controlled by the door 42.

A similar baking box or tray 90 is slidably mounted in the compartment 71 and is similarly provided with flange-like legs 91, a spacing member 92, and is also furnished with partitions 95 which are useful in separating small articles to be baked such as biscuits. As shown in FIGURE 9 of the drawings, the baking tray or box 90 is provided with a handle 97 to assist in its removal from the unit. FIGURE 9 of the drawings also shows the manner of insertion and removal of the partition 81 in the same way.

It will be noted that the openings 51 and 52 through which hot gases may pass from the two lower fireboxes communicates with one side of the partition plate 80 and around the lower edge of this plate. These gases may pass through openings 99 in the supporting flange 77 and thence around the lower edge of the roasting or baking box 85 up the space beneath and to the rear of this box through the space which is afforded by the flange-like legs 86, thence through the openings 73 in the partition 72 and upwardly to the rear of the baking box 90, and finally out through the openings 27 which may be controlled by a damper 100 to regulate the amount of heat permitted to pass beneath and around the respective roasting and baking compartments. The roasting box 85 is best adapted for the utilization of more heat than the baking box 90 and may well be used for roasting potatoes and the like. The baking box 90 on the other hand, is more remote from the source of the hot gases and is insulated from the upper two fuel compartments by means of the panel 81, 83 and is best adapted for baking of articles which require moderate heat.

In FIGURE 1 of the drawings, there is shown how the swinging of the wall section 28 about its hinge 32 provides a level surface for the placement of pots and

United States Patent Office 3,152,586
Patented Oct. 13, 1964

3,152,586
COOKING APPARATUS
Warren O. Russell, Rangeley, Maine
Original application Nov. 20, 1956, Ser. No. 623,427, now Patent No. 3,085,500, dated Apr. 16, 1963. Divided and this application Apr. 10, 1961, Ser. No. 101,962
10 Claims. (Cl. 126—9)

This invention relates to cooking devices and more particularly to devices of this class which may be made to be portable and conveniently arranged and constructed for use on camping trips, cook-outs, prospecting or exploring expeditions, and the like.

This application is a division of my co-pending application Serial No. 623,427, filed November 20, 1956, now Patent No. 3,085,500, granted April 16, 1963.

The general object of the invention is to provide a novel and improved device of this character which is easy to set up, take down or dismantle, and operate for the efficient cooking of food of many varieties, whether the process involves roasting, broiling, baking, boiling, stewing, frying, or other processes.

One important feature of the invention is the novel ingenious provision for the control of the application of heat to the comestible being cooked, taking into account the natural tendency of the hot convection gases from the source of heat to rise, and also the utilization of the emission of heat from such source by radiation.

A particular virtue of the present invention is the versatility of the compact cooking apparatus, whereby one can prepare a complete and quite elaborate outdoor meal, with each dish being "done" at its appointed time, and without interference from any of the others which are being prepared at the same time. Thus, for example, meats may be broiled or roasted, vegetables baked or boiled, potatoes baked or roasted, biscuits baked, meat and eggs fried, and coffee boiled all at the same time.

In its preferred embodiment, the invention contemplates the provision of a firebox which combines the features of providing the source of heat for all of the various cooking operations, together with ovens for roasting and baking, and a level stove surface for frying, boiling and simmering. The apparatus further includes, in close association and combination with this firebox and stove unit, a novel adjustable supporting grid for holding meat products of widely diverse kinds in the proper regulatable proximity to the fire in the firebox unit, whether these meats are in the form of hamburgers, frankfurters, steaks, or of a thicker and more rounded configuration as beef roasts or chicken and other poultry.

The novel apparatus is so constructed that not only the meat supporting grid and its adjustable base elements but also supporting means for the firebox may be all dismantled, packed into the firebox unit, and transported with the ease of a suitcase or travelling bag.

Other objects and features of novelty, including various constructional features of the firebox and oven, and supporting and angular adjustment features of the grid structure, will be apparent from the following specification when read in connection with the accompanying drawings in which certain embodiments of the invention are illustrated by way of example.

In the drawings:

FIGURE 1 is a view partly in side elevation and partly in vertical cross section, of an outdoor cooker embodying the principles of the invention; the device being set up to prepare a meal including dishes which are to be roasted, baked, stewed or otherwise prepared;

FIGURE 2 is a top plan view of the apparatus as set forth in FIGURE 1;

FIGURE 2A is a plan view of one end of the firebox and oven unit with a hinged section thereof shown in closed position;

FIGURE 3 is a sectional view on an enlarged scale through the firebox taken on line 3—3 of FIGURE 1;

FIGURE 4 is a fragmentary view in side elevation of a portion of the adjustable broiler grid support shown in FIGURE 1;

FIGURE 5 is a further enlarged detail view of the same portion of the apparatus;

FIGURE 6 is a fragmentary sectional view taken on line 6—6 of FIGURE 4;

FIGURE 7 is a fragmentary view in persepctive of a portion of the broiling grid support showing an adjustment feature for the operating handle;

FIGURE 8 is a view in perspective of the entire apparatus packed for transport;

FIGURE 9 is a transverse sectional view taken on line 9—9 of FIGURE 1 and considerably enlarged;

FIGURE 10 is a fragmentary sectional view taken on line 10—10 of FIGURE 9;

FIGURE 11 is a fragmentary perspective view illustrating a partition supporting feature of the firebox;

FIGURE 12 is a view in perspective of one form of grid for supporting meat or other articles for broiling;

FIGURE 13 is a fragmentary view in side elevation showing an adjustable pivot connection between the broiler grid and one of its supporting arms;

FIGURE 14 is a fragmentary sectional view taken on line 14—14 of FIGURE 13;

FIGURE 15 is a transverse sectional view taken on line 15—15 of FIGURE 14;

FIGURE 16 is a perspective view of a cover frame for the grid;

FIGURE 17 is a transverse sectional view through the broiler grid and its cover frame;

FIGURE 18 is a sectional view taken substantially on the line 18—18 of FIGURE 17;

FIGURE 19 is a view in side elevation of a modified form of broiler grid;

FIGURE 20 is an end view of the same showing in broken lines a horizontal adjustment of the grid;

FIGURE 21 is a fragmentary top plan view of the grid substantially as seen from line 21—21 of FIGURE 20;

FIGURE 22 is a fragmentary sectional view taken on line 22—22 of FIGURE 20;

FIGURE 23 is a detail sectional view taken on line 23—23 of FIGURE 20;

FIGURE 24 is a fragmentary sectional view taken on line 24—24 of FIGURE 21;

FIGURE 25 is a view in transverse section through a modified form of grid bar which may be advantageously used in this connection;

FIGURE 26 is a somewhat diagrammatic view in side elevation of a modified form of the invention wherein the entire assembly is supported upon a collapsible frame or table;

FIGURE 27 is a perspective view of the supporting table;

FIGURE 28 is a sectional view taken on line 28—28 of FIGURE 27;

FIGURE 29 is a schematic view showing a certain prior art arrangement which fails to meet the requirements for efficient service which are attained by the present invention; and FIGURE 30 is a schematic view of the arrangement made in accordance with the present invention and indicating the superior adjustment of the broiler as compared with the prior art.

One of the preferred forms of the invention is illustrated in general assembly and in position for use, in FIGURES 1 and 2 of the drawings, and in knocked-down compact condition for travel in FIGURE 8. In pans, such as indicated at 101 and 102, for the boiling, frying, or stewing of comestibles, and it will be readily understood how the cross rods 105, 106 and 107 aid in forming a sort of grid to support these utensils. Obviously, a hot fire in the uppermost firebox compartment will afford good heat for boiling, frying, or stewing of vegetables or the like to the left of this level upper work surface, and foodstuffs which are to be simmered or merely kept warm may be moved to the right-hand side of this supporting surface further away from the fire.

The broiler portion of the device together with its supporting derrick or crane (designated in its entirety by the letter B) will now be described in detail and its novel, efficient, and necessary cooperation with the section A explained. The base frame of this section of the apparatus is designated generally by the reference numeral 110 and comprises a generally rectangular member 111 which is pivoted to a similarly flat member 112, the latter member having a semi-circular end portion 113. The pivotal or hinge connection between the members 111 and 112 comprises a rule joint the pintle of which is indicated at 115. One of the faces of the abutting ends of the two members (in this case the member 112) is provided with a notch 117 which is adapted to receive a stub pintle for supporting an adjustable portion of the broiler rack which will be described presently.

Although any preferably skeleton construction can be adopted for the support 110, a very useful one is illustrated in the drawings where the framework consists essentially of an upper rod 120, a lower rod 121, and a zig-zag intermediate rod 122 which may have its nodal points welded alternately to the upper and lower rods 120 and 121. This construction affords a very light-weight and easily portable framework.

Any suitable cross bracing such as indicated at 125 may be provided for the substantially rectangular frame 111 and a skeleton cross piece 126 may suffice for bracing the frame section 112 and also for providing pivotal support for an operating lever as will be described.

A vertically pivotable crane arm or beam member 130 comprises the side frames 132 and 133, each of which has a downwardly depending rectilinear leg member 135, these parts being braced by means of the struts 136 and a cross frame 137 connecting the two side frames 132 and 133 near the knees between the side frames and the legs 135.

At the base of each of the legs 135 there is provided a block 140 from which extends a stub shaft or pintle 141 which is outwardly directed to be received within one of the notches 117 involved in the rule joint which is pivoted at 115. It will thus be seen that when the pivoted sections 111 and 112 are brought into alignment and the rule joint into abutment, the pintles 141 will be securely held in rotative position whereby the crane member 130 may pivot in a vertical plane.

Intermediate the length of the cross frame 137 of the crane member 130, there is provided a hook 145 or other attachment element to which one end of the chain 146 is attached. Pivoted upon the cross brace 126 of the rear base element 112 as at 148 is the operating arm 150 which may be of the same type of skeletonized construction as the members and the base frames. The pivot 148, it will be noted from an inspection of FIGURE 2, is somewhat off-center as respects the mid-point of the cross brace 126. The arm 150 is provided with the angular bracket frame 152 which may be braced as by means of the bar 153. Near the end of this angular frame 152, a securing means 155 is provided for the other end of the chain 146.

The operating or adjusting lever 150 extends rearwardly above the semi-circular curved portion 113 of the base frame section 112 and is received beneath the similarly semi-circularly curved bar 156. As shown best in FIGURES 1 and 7 of the drawings, this bar 156 is provided with spaced abutments 157 between which occur the relieved portions or notches 158 within which the handle frame 150 may be retained in a number of adjusted positions.

It will be seen from the description thus far that angular adjustment of the handle 150 in a horizontal plane will cause the chain 146 to be tensioned or relaxed depending upon the direction of movement and thus either pull rearwardly upon or ease off on the connection 145 and thus raise or lower the broiler crane 130 about its pintles 141 and thus regulate the position of the right-hand or operative end of the crane 130 which carries the broiler 200, relatively to the firebox section A of the apparatus.

Certain embodiments of the broiler itself will now be described particularly in connection with FIGURES 1 and 12–18 of the drawings. The grid-like meat holder or broiler proper to which the reference numeral 200 has been applied comprises a skeleton framework which in its preferred form includes the parallel rods or bars 201 having in-turned ends 202 which are welded to one of a series of bars 203 which go to make up the side frame portions of the broiler. Certain of the rods 204, forming the base panel along with those designated 201, are bent inwardly and then parallel with the base to form generally U-shaped side frames indicated at 205. It will be seen that there are four of these U-frames, two upon each side of the device.

The end panels of the broiler grid comprise the relatively short rods 208 having ends bent inwardly at 209 welded to the transverse portion 210 of a marginal rod which extends for a distance parallel with the rods 208 as indicated at 211 and thence along the edges of the entire base panel as at 212.

Upon one side of the broiler frame the parallel rods 203 forming the skeleton side frame are broken away near the central portion to accommodate an adjustable clamping lever 215, which is employed to secure the cover grid 220 to the broiler proper. This cover grid is illustrated clearly in FIGURE 16 of the drawings and is shown applied to the broiler in FIGURES 17 and 18. The cover grid comprises essentially a peripheral rod of rectangular shape designated 222, across which are welded the parallel transverse rods 223. Four of these cross rods 223 are extended and joined to provide loops 225 at one side of the cover grid 220, these loops being adapted to be inserted within the U-shaped frame members 205 of the broiler proper, between the outer looped portion 205 and one of the bars 203 or between any of the bars 203 depending upon the thickness of the meat or other article being broiled.

Two other of the cross rods 223 are extended beyond the opposite side of the cover to form the U-shaped extension 227 and a latch engaging rod or bar 228 is secured in a position transversely of the U-bend 227.

The latch 215 is pivoted upon a stud 230 and this latch is provided with notches 231 within which the rod or bar 228 of the cover may be received. Thus it will be readily seen how the cover may be applied by the insertion of the loops 225 between certain of the side frame bars 203 of the broiler, the opposite loop 227 brought between the two side frame portions 205 at that side of the broiler and the clamping lever 215 moved so as to appropriately engage the latch bar 228.

The means for pivotally supporting or trunnioning the broiler upon the upwardly extending end of the crane 130 will now be described. Bars 235 of preferably rectangular cross-section are welded or otherwise secured centrally of the end frames which are constituted by the bars 208 and disposed in parallel relation with said short bars. These bars or blocks 235 provide a track for the cylindrical hubs 236 as best shown in FIGURES 12, 14, 17 and 18. Near the inner end of the cylindrical hub 236 it is rabbeted off to form parallel grooves upon each side which fit against the bars 235. Clamped against the opposite side of these bars is the flat circular plate 238 through which the bolt 240 passes and the whole assembly including the plate 238 and the hub 236 may be clamped into selected position along the guide bars 235 by means of the wing nut 241.

Referring now to FIGURES 1, 13, 14 and 15 of the drawings, it will be perceived that the end portions of the side frames of the crane 130 are provided with hook-shaped metal straps 245, the flat shank portions 247 of which may be welded, riveted, or bolted to these side frames with the loop portions projecting forwardly to receive the hub elements 236. In order to clamp the hubs in selected rotative positions, a pivoted clamping device is provided which may be fixed to the end of the crane arms or employed as a separate element of the assembly. This clamp designated 248 may be made of an ordinary hinge having two hasps, one of which 249 is applied to the lower surface of the end of one of the side frames of the crane 130, and the other hasp 250 pivoted to the pintle 251 may be swung about the pivot to clampingly engage the hub 236, this hasp 250 being retained in hub clamping position by means of the lock shackle 254 which, in the event the hasp 249 is not otherwise secured to the crane 130, may also serve to clamp both hasps in binding position about the hubs.

From the above description it will be understood how the broiler may be adjusted with respect to its hubs so as to bring the pivot centers represented by the pin 240 as near as possible to the center of gravity of the broiler including the meat or other article of food contained therein. This is of course accomplished by loosening the wing nut 241 adjusting the hubs to the desired position along the guides 235, and then tightening the wing nuts. In order to position the broiler at the optimum angularity with respect to the firepot unit A, the clamps 248 are released by the removal of the shackles 254 and the broiler with its hubs 236 rotated to the proper position and the clamps 248 re-applied.

Another embodiment of broiler is illustrated in FIGURES 19–25 inclusive and is given the general reference designation 300. This broiler is, by virtue of its peculiar configuration, somewhat more adapted for the support of thicker cuts of meat than an ordinary steak and is well adapted to support roasts of different kinds such as indicated at 301. For this purpose the device is approximately hexagonal in end view, having a pair of opposed angular grids 302 and 303, these grids consisting of two series of angle iron strips 304, the abutting ends adjacent the center of the device being welded to the cross bar 305 as clearly shown in FIGURE 24. The opposite ends of the angle bars 304 are welded to the cross bars 307 and 308 on the one side and to the cross bars 309 and 310 on the other.

The grid framing on one side of the broiler is braced and supported in a manner different from the other in order to secure it to the outer ends of the crane arms in properly adjusted position both angularly with respect to the fire and bodily for purposes of supporting it as closely adjacent its center of gravity as possible. Thus, diagonal struts 312 extend from the rods 309, 310 to the slotted brackets 315 upon each side of the device. These brackets are each provided with an elongated slot 316 and a hub 320 is cut away at one end along parallel surfaces in a manner exactly similar to the construction of the hub 236 of the previously described embodiment. A block or plate 321 is disposed upon the opposite side of the slotted bracket 315 and the bracket is clamped by means of the bolt 322 and the wing nut 323, when adjusted to a position along the slot 316 which represents the approximate center of gravity of the broiler and its contents.

Of course, the hubs 320 are adapted to be supported by the clamps 248 at the end of the crane 130 in exactly the same way as the previously described device.

Continuing the description of the structure of this broiler element it will be noted that the top portion of the device as viewed in FIGURES 19 and 20 is comprised of the two transverse bars 325, and upstanding threaded studs or bolts 326 carried by the bars 307 and 309 extend through openings in the bars 325 and the bolts are secured rigidly thereto as by means of the nuts 327. FIGURE 21 reveals that there are a plurality of openings 328 in the bar 325 through which the bolts 326 may extend, depending upon the thickness of the roast or other meat being supported.

At the bottom of the broiler as shown in FIGURE 20 there are disposed at least two cross pieces 330 which are notched at a plurality of points there along as at 332. Once the approximate thickness of the meat to be supported in this broiler is determined, the bolts 326 are adjusted to the proper openings 328 in the upper bars 325 and then the lower cross bar 310 of the frame 302 and the lower cross bar 308 of the frame 303 are each forced into appropriate ones of the notches 332 in the bars 330 so as to clamp the roast firmly therein.

It is obvious that the broiler can be swung to any angular position with relation to the fire, a susbtantially horizontal position being shown in broken lines in FIGURE 20.

One important feature of this embodiment resides in the angular cross-section of the grid bars 304 and also the breaking of the continuity of these angular bars as at 340 near the mid-portion. As the cooking proceeds, the juices from the meat will be caught in these trough-like bars and run down the troughs and be discharged either at the outer ends of the bars 304 or through the break 340 at the center point thereof depending upon the angular position of the broiler.

As suggested at 345 in FIGURE 1, a pan or other receptacle may be placed below the broiler to catch the juices and they may be used in the preparation of gravies or the like.

In FIGURE 25 there is illustrated in cross-section a grid bar 304' which is arcuate in cross-section in order to provide a trough, all points of which will be substantially evenly heated, and thus avoid any possibility of the juices or gravy being scorched or retained in a sharply angled crevice.

In FIGURES 26–28 inclusive there is illustrated an adaptation of the invention whereby both of the principal sections A and B are supported above the ground level upon a knocked-down table, frame or pedestal C. The broiler supporting base 110' and the crane 130' as well as the particular embodiment of the broiler 200' may follow closely the structure described in connection with the earlier embodiments. Similarly, the firepot and oven enclosure A may be of the same nature and adapted for the same uses.

The pedestal or support C comprises essentially the angle iron side pieces 350, the similarly constructed end pieces 351, and the plate 352 at the opposite end of the frame. Each corner of this frame is supported by pivoted angle iron legs 354 having braces 353 with rule joints therein so that the legs may be folded against the frame in a manner similar to that employed in the conventional card tables.

As shown in FIGURE 28 a bracket 360 is secured adjacent the forward edge 352 of the frame, and pivoted as at 361 to this bracket is an arm 362 having a notch 363 at its free outer end. One or more of such arms may be provided as a support for the firepot and oven unit A as shown in FIGURE 26. In order to retain the arm 362 at the proper angle when in use, a U-shaped brace 365 has its legs pivotally carried by a cross shaft 366 trunnioned in the vertical webs of the side pieces 350 and provided with a coupling 367 to which a crank may be applied to rotate the shaft 366 and raise the bail or brace 365 until it fits into the notch 363 of the supporting arm or arms 362. A pin or projection 369 may be provided on one or both of the side bars 350 for supporting the bail 365 in its lowered position.

An extension is pivoted to the frame C for supporting the base of the crane and broiler support B, and this extension comprises the elongated arms 370 which may be joined by a cross piece 371 at their forward ends, the rear ends of the arms 370 being pivoted as at 373 to the side frames 350. These arms 370 may be offset by the particular construction shown in FIGURE 27 whereby a short piece 375 carries the pivot 373 and is connected to the arms 370 proper by means of the lateral pieces 376 and 377. Suitable means such as lugs 378 on the pieces 375 may be provided for abutting the cross piece 352 of the frame to prevent the pivoting movement of this extension downwardly beyond the horizontal.

The structural details of the invention now having been described, some of the theoretical considerations underlying the invention will be adverted to. The application of heat to the roasting and baking ovens, to the boiling or stewing of foodstuffs in the pots and pans at the top of the unit A, will be readily understood by following the flow of heating gases within the unit A. The pans at the front of the unit will of course be directly heated by the fire in the uppermost firebox section. The pots or pans at the rear of this upper level will receive the least heat of all and this area will naturally be used only for warming purposes, some of the heat being supplied through the upper damper controlled openings 27 in the firebox. The heat from the two lower firebox compartments will pass into and around the roasting box or tray 85 and thence through the opening 73 in the partition 72 into the baking compartment which is somewhat shielded from the direct heat from the two upper fireboxes.

One of the most important features of the invention is involved in the relative positioning of the broilers 200 or 300 with respect to the angular frontal openings of the fireboxes 36. In order to better understand the theoretical considerations underlying this unique positioning, reference may be made to the prior art illustration comprising FIGURE 29 of the drawings wherein a vertical firebox with side openings is shown at 400, the combined convection and radiant heat issuing from the left-hand side of the firebox according to the pattern indicated by the line 401. A horizontal bracket is indicated by the line 402 from which is vertically suspended a broiler 405. It will be noted that under these conditions the upper edge of the meat contained in the broiler will more than likely be scorched while the portion at the lower end thereof will either not be cooked at all or only slightly affected by the heat of the fire.

On the other hand, a diagrammatic showing of the arrangement afforded by the present invention is shown in FIGURE 30, where the firebox A is tilted at an angle of approximately forty-five degrees so that the line of substantially uniform heat indicated at 410 assumes the position indicated. The broiler B is brought to an angle corresponding to that of the line 410 and at a distance from the heat line dependent upon the rate and intensity of cooking desired. In FIGURE 26 of the drawings, again the heat line is indicated at 410 and the broiler 200' assumes this same angle and is situated at a distance D from the line 410 appropriate to the rate of cooking of the material in the broiler. It is obvious that the broiler can be brought to a greater or smaller distance D from this wall of heat, and to determine by the actual temperature reading the proper positioning of the broiler, a thermometer 425 is provided adjacent the forward side of the broiler nearest the fire, and this thermometer may be supported upon the end of the adjustable slotted strip 426 which may be clamped by means of the wing nut 427 to one of the clamping devices 248.

Some of the novel features of the invention, including the preferred inclination of the source of heat and of the broiler, may be embodied in cookers in which the heat source is electrical or fluid, and whether or not the device is used outdoors or in a stove, fireplace, or other enclosure inside of a building. The criterion is that the heat be approximately flameless, the draft being natural and unforced, the latter term being used herein to distinguish the present heat distribution from anything resembling blast lamps, Bunsen burners, or the like.

It is understood that various changes and modifications may be made in the embodiments illustrated and described herein without departing from the scope of the invention as determined by the subjoined claims.

Having thus described the invention, what is claimed as new and desired to be secured by Letters Patent is:

1. Unitary combination portable cooking apparatus especially adapted for outdoor use in preparing an entire meal including roasting, baking, stewing, frying and boiling, said apparatus comprising in combination means including a self-contained firebox of the shape of a rectangular parallelepiped for supplying a source of radiant and convection heat, said firebox being open at one side thereof to emit such heat by direct radiation and by convection through the natural unforced outward and upward flow of combustion gases, said firebox being closed in on its remaining five sides for the most part, said means including said firebox providing for substantially uniform distribution of heat emission throughout the area of said open side, means for supporting said firebox upon one of its angular edges at an angle to the horizontal of less than 90° so that the open side thereof faces diagonally outwardly and upwardly, said open side being free of any enclosure, the construction and arrangement of the means including said firebox and said supporting structure being such that the emission of heat both by radiation and convection establishes a resultant substantially straight diagonal plane of uniform heat distribution which stands above said firebox and at an acute angle with the plane of the first mentioned open side of said firebox; and a broiler grid having a substantially planar surface and adapted to contain meat or the like to be cooked by the heat from said firebox as described, and means for supporting said grid in close cooperating proximity to said firebox, and with its plane surface at an acute angle to the plane of the open side of the firebox which angle is substantially the same as the angle of the plane of uniform heat distribution with respect to said open side, said supporting means including means for adjusting said grid to positions in planes parallel with its acute angled plane and at variable distances therefrom for controlling the degree of heating supplied to said grid from said emission.

2. Cooking apparatus especially adapted for outdoor use, said apparatus comprising a self-contained firebox and oven device of the shape of a rectangular parallelepiped, and having a partition extending from the upper end to the lower end thereof, dividing the device into a fire containing section and an oven section, said device being open at the side thereof upon which the fire containing section is disposed to emit heat by direct radiation and by convection through the natural outward and upward flow of combustion gases, said device being closed in on its remaining five sides for the most part, means for supporting said device upon one of its lower angular edges at an angle of approximately forty-five degrees so that the open side thereof faces diagonally outwardly and upwardly, the oven section thus facing diagonally downwardly, means for transmitting heat through said partition from the fire containing section to the oven section, and the open side of said firebox being free of any enclosure.

3. The apparatus as set forth in claim 2 in which are provided comestible containers slidably received within said oven compartments, the heat transmitting means comprises openings through the lower portion only of the partition and openings in the upper wall of the device as well as the transmission of heat by conduction through the partition, and the means provided for varying the heat comprises dampers for said upper wall openings and a slidably removable insulating panel disposed adjacent a portion of said partition.

4. The apparatus as set forth in claim 3 in which said fire containing section of the device is divided into a plurality of fire compartments by means of hinged partitions, a portion of the upper wall of the device is pivoted to the remaining portion thereof to swing to a horizontal position to support cooking utensils at the top of the device.

5. In a cooking apparatus of the class described, a combined firebox and oven device comprising a rectangular box-like structure of parallelepiped configuration, a partition extending from the top to bottom of the device dividing it into a fire containing section and an oven section, said device having top and bottom walls, two opposite side walls, and two opposite end walls, the side wall of the device on the fire containing part being removable to open that side for the outward emission of heat, substantially half of one end wall being hinged to open the oven section for the insertion and removal of comestibles to be cooked, and substantially one-half of the top wall being hinged to swing to a horizontal comestible supporting position when the device is tilted to an inclined position in operation.

6. The apparatus as set forth in claim 5 in which the removable side wall of the device is provided with a pivoted brace frame and the opposite fixed side wall of the device is provided with at least one bracket, whereby the device when in use may be set at an angle to the horizontal of less than ninety degrees upon the horizontally disposed removable side wall and braced in such inclined position by interlocking the free ends of the pivoted brace frame with said bracket.

7. The apparatus as set forth in claim 5 in which a rectangular pedestal is provided for supporting the device above ground level.

8. The apparatus as set forth in claim 5 in which a transporting handle is secured to the upper wall of the device, whereby when the various hinged and removable side walls are in closed position the device may be readily transported from place to place.

9. Unitary combination portable cooking apparatus especially adapted for outdoor use in simultaneously preparing the ingredients of an entire elaborate meal involving roasting, baking, stewing, frying, and boiling from substantially a single source of heat; said apparatus comprising, in combination a self-contained firebox of the shape of a rectangular parallelepiped, consequently having three pairs of oppositely disposed sides, means for supporting said firebox upon one of its lower angular corners at an angle to the horizontal of less than 90° to present one of said sides as a front side of the firebox facing diagonally outwardly and upwardly, and the opposite or rearward side facing correspondingly diagonally downwardly; said firebox being divided into compartments by a partition extending substantially from top to bottom of the firebox and parallel to and intermediate the said front and rear sides, a compartment on one side of said partition and adjacent the rearward side of the firebox serving as a baking oven compartment, said front side being open and free of any enclosure, and a compartment on the other side of said partition and adjacent to said open front side of the firebox, said last named compartment serving as a fuel compartment adapted to contain a quantity of solid fuel for supplying a source of heat; and means for transmitting heat from said fuel compartment to said oven compartment, said firebox being for the most part closed in on its five sides other than the said front side, said open front side of the firebox adapted to emit heat freely by direct radiation and by convection through the natural unforced outward and upward flow of combustion gases, the angular inclination of the firebox and especially of the heat-emitting open front side thereof establishing a resultant substantially straight plane of uniform heat emission which stands at an acute angle with respect to the plane of the said open front side of the firebox, said resultant plane of uniform heat emission establishing a basic position from which a comestible support may be adjusted to vary the degree of uniform heat transfer thereto.

10. Cooking apparatus as set forth in claim 9 in which there is provided a broiler grid having an approximately planar surface, and means for adjustably supporting said broiler grid in selective positions with its planar surface disposed in planes parallel to said plane of substantially uniform heat transfer and at variable distances therefrom for controlling the degree of uniform heating supplied to the grid by both radiation and the natural flow of combustion gases from the unforced burning of the solid fuel.

References Cited in the file of this patent

UNITED STATES PATENTS

| | | |
|---|---|---|
| 261,870 | Perkins | Aug. 1, 1882 |
| 320,801 | Knight et al. | June 23, 1885 |
| 434,242 | Buzzacott | Aug. 12, 1890 |
| 747,814 | Watson | Dec. 22, 1903 |
| 1,404,808 | Taylor | Jan. 31, 1922 |
| 2,441,190 | Fuller | May 11, 1948 |
| 2,515,035 | Fernly | July 11, 1950 |
| 2,520,578 | Treloar | Aug. 29, 1950 |
| 2,565,000 | Schultz | Aug. 21, 1951 |
| 2,573,988 | Saltzberg | Nov. 6, 1951 |
| 2,821,187 | Tescula | Jan. 28, 1958 |
| 2,885,950 | Stoll et al. | May 12, 1959 |

FOREIGN PATENTS

| | | |
|---|---|---|
| 23,360 | Great Britain | of 1894 |